(12) United States Patent
Liu et al.

(10) Patent No.: US 10,311,424 B2
(45) Date of Patent: Jun. 4, 2019

(54) INDICIA ENCODING SYSTEM WITH INTEGRATED PURCHASE AND PAYMENT INFORMATION

(75) Inventors: Yong Liu, Jiangsu (CN); Xiaoxun Zhu, Jiangsu (CN); Jie Ren, Jiangsu (CN)

(73) Assignee: HAND HELD PRODUCTS, INC., Fort Mill, SC (US)

(*) Notice: Subject to any disclaimer, the term of this patent is extended or adjusted under 35 U.S.C. 154(b) by 900 days.

(21) Appl. No.: 13/885,218

(22) PCT Filed: Dec. 9, 2010

(86) PCT No.: PCT/CN2010/001998
§ 371 (c)(1),
(2), (4) Date: Oct. 6, 2013

(87) PCT Pub. No.: WO2012/075608
PCT Pub. Date: Jun. 14, 2012

(65) Prior Publication Data
US 2014/0025584 A1    Jan. 23, 2014

(51) Int. Cl.
*G06Q 20/32* (2012.01)
*G07G 1/00* (2006.01)
*G06Q 30/06* (2012.01)

(52) U.S. Cl.
CPC ..... *G06Q 20/3227* (2013.01); *G06Q 20/3276* (2013.01); *G06Q 30/06* (2013.01); *G07G 1/0045* (2013.01)

(58) Field of Classification Search
None
See application file for complete search history.

(56) References Cited

U.S. PATENT DOCUMENTS 4,321,672 A * 3/1982 Braun ................... G06Q 20/04
235/379
5,019,699 A    5/1991 Koenck
(Continued)

FOREIGN PATENT DOCUMENTS

CN    2694386 Y    4/2005
CN    101454797 A    6/2009
(Continued)

OTHER PUBLICATIONS

Sep. 29, 2011 International Search Report in International Application No. PCT/CN2010/001998.
(Continued)

*Primary Examiner* — Tsan-Yu J Huang
*Assistant Examiner* — Gabriel Mercado
(74) *Attorney, Agent, or Firm* — Additon, Higgins & Pendleton, P.A.

(57) ABSTRACT

An indicia encoding system is disclosed herein that encodes integrated information on products and/or services selected for purchase and payment information for purchasing the selected products and/or services, in accordance with a variety of embodiments involving various methods, devices and systems. In one illustrative embodiment, a method may include entering purchase order information via one or more input/output components. The purchase order may include an indication for one or more products and/or one or more services. The method may also include entering payment information, including information on a method of payment, via one or more input/output components. The method may also include generating a machine-readable indicia that encodes both the purchase order information and the payment information, with the payment information in an encrypted form; and displaying the machine-readable indicia on a screen.

21 Claims, 6 Drawing Sheets

(56) References Cited

U.S. PATENT DOCUMENTS

| | | | |
|---|---|---|---|
| 5,406,062 A | 4/1995 | Hasegawa et al. | |
| 5,481,395 A | 1/1996 | Byker | |
| 5,504,367 A | 4/1996 | Arackellian et al. | |
| 5,541,419 A | 7/1996 | Arackellian | |
| 5,572,006 A | 11/1996 | Wang et al. | |
| 5,576,529 A | 11/1996 | Koenck et al. | |
| 5,581,071 A | 12/1996 | Chen et al. | |
| 5,591,955 A | 1/1997 | Laser | |
| 5,646,390 A | 7/1997 | Wang et al. | |
| 5,648,650 A | 7/1997 | Sugifune et al. | |
| 5,701,001 A | 12/1997 | Sugifune et al. | |
| 5,756,981 A | 5/1998 | Roustaei et al. | |
| 5,784,102 A | 7/1998 | Hussey et al. | |
| 5,815,200 A | 9/1998 | Ju et al. | |
| 5,877,487 A | 3/1999 | Tani et al. | |
| 5,886,338 A | 3/1999 | Arackellian et al. | |
| 6,010,070 A | 1/2000 | Mizuochi et al. | |
| 6,230,975 B1 | 5/2001 | Colley et al. | |
| 6,254,003 B1 | 7/2001 | Pettinelli et al. | |
| 6,280,054 B1 | 8/2001 | Cassarly et al. | |
| 6,283,374 B1 | 9/2001 | Fantone et al. | |
| 6,347,163 B2 | 2/2002 | Roustaei | |
| 6,412,700 B1 | 7/2002 | Blake et al. | |
| 6,488,389 B2 | 12/2002 | Cassarly et al. | |
| 6,669,093 B1 | 12/2003 | Meyerson et al. | |
| 6,681,037 B1 | 1/2004 | Koljonen | |
| 6,695,209 B1 | 2/2004 | La | |
| 6,749,120 B2 | 6/2004 | Hung et al. | |
| 6,768,812 B1 | 7/2004 | Koljonen | |
| 6,832,725 B2 | 12/2004 | Gardiner et al. | |
| 6,854,650 B2 | 2/2005 | Hattersley et al. | |
| 6,877,661 B2 | 4/2005 | Webb et al. | |
| 7,053,954 B1 | 5/2006 | Canini | |
| 7,061,395 B1 | 6/2006 | Bromer | |
| 7,077,321 B2 | 7/2006 | Longacre, Jr. et al. | |
| 7,083,097 B2 | 8/2006 | Toyama et al. | |
| 7,083,098 B2 | 8/2006 | Joseph et al. | |
| 7,110,714 B1* | 9/2006 | Kay | H04H 20/38 |
| | | | 455/158.1 |
| 7,131,587 B2 | 11/2006 | He et al. | |
| 7,148,923 B2 | 12/2006 | Harper et al. | |
| 7,185,817 B2 | 3/2007 | Zhu et al. | |
| 7,204,418 B2 | 4/2007 | Joseph et al. | |
| 7,219,843 B2 | 5/2007 | Havens et al. | |
| 7,234,641 B2 | 6/2007 | Olmstead | |
| 7,240,844 B2 | 7/2007 | Zhu et al. | |
| 7,255,279 B2 | 8/2007 | Zhu et al. | |
| 7,270,274 B2 | 9/2007 | Hennick et al. | |
| 7,303,126 B2 | 12/2007 | Patel et al. | |
| 7,308,375 B2 | 12/2007 | Jensen et al. | |
| 7,320,431 B2 | 1/2008 | Zhu et al. | |
| 7,336,197 B2 | 2/2008 | Ding et al. | |
| 7,357,326 B2 | 4/2008 | Hattersley et al. | |
| 7,387,250 B2 | 6/2008 | Mani | |
| 7,398,927 B2 | 7/2008 | Olmstead et al. | |
| 7,490,778 B2 | 2/2009 | Zhu et al. | |
| 7,503,499 B2 | 3/2009 | Zhu et al. | |
| 7,513,430 B2 | 4/2009 | Zhu et al. | |
| 7,516,899 B2 | 4/2009 | Laser | |
| 7,527,207 B2 | 5/2009 | Acosta et al. | |
| 7,533,824 B2 | 5/2009 | Hennick et al. | |
| 7,568,628 B2 | 8/2009 | Wang et al. | |
| 7,611,060 B2 | 11/2009 | Wang et al. | |
| 7,656,556 B2 | 2/2010 | Wang | |
| 7,658,324 B2* | 2/2010 | Gindele | G06Q 20/0457 |
| | | | 235/379 |
| 7,690,575 B2 | 4/2010 | Vinogradov | |
| 7,693,744 B2 | 4/2010 | Forbes | |
| 7,735,737 B2 | 6/2010 | Kotlarsky et al. | |
| 7,762,464 B2 | 7/2010 | Goren et al. | |
| 7,770,799 B2 | 8/2010 | Wang | |
| 7,775,436 B2 | 8/2010 | Knowles et al. | |
| 7,780,089 B2 | 8/2010 | Wang | |
| 7,809,407 B2 | 10/2010 | Oshima et al. | |
| 7,810,720 B2 | 10/2010 | Lovett | |
| 7,813,047 B2 | 10/2010 | Wang et al. | |
| 7,909,257 B2 | 3/2011 | Wang et al. | |
| 7,918,398 B2 | 4/2011 | Li et al. | |
| 7,995,178 B2 | 8/2011 | Suguro et al. | |
| 8,074,887 B2 | 12/2011 | Havens et al. | |
| 2002/0179709 A1* | 12/2002 | Mehler | G06K 7/10782 |
| | | | 235/454 |
| 2003/0062413 A1 | 4/2003 | Gardiner et al. | |
| 2003/0222147 A1 | 12/2003 | Havens et al. | |
| 2004/0020990 A1 | 2/2004 | Havens et al. | |
| 2004/0164165 A1 | 8/2004 | Havens et al. | |
| 2005/0001035 A1 | 1/2005 | Hawley et al. | |
| 2005/0023356 A1 | 2/2005 | Wiklof et al. | |
| 2005/0103854 A1 | 5/2005 | Zhu et al. | |
| 2005/0279836 A1 | 12/2005 | Havens et al. | |
| 2006/0011724 A1 | 1/2006 | Joseph et al. | |
| 2006/0043194 A1 | 3/2006 | Barkan et al. | |
| 2006/0113386 A1 | 6/2006 | Olmstead | |
| 2006/0144924 A1* | 7/2006 | Stover | G06Q 20/042 |
| | | | 235/379 |
| 2006/0163355 A1 | 7/2006 | Olmstead et al. | |
| 2006/0202032 A1 | 9/2006 | Kricorissian | |
| 2006/0202036 A1 | 9/2006 | Wang et al. | |
| 2007/0138293 A1 | 6/2007 | Zhu et al. | |
| 2007/0181692 A1 | 8/2007 | Barkan et al. | |
| 2007/0284529 A1 | 12/2007 | McQueen | |
| 2008/0023556 A1 | 1/2008 | Vinogradov et al. | |
| 2008/0210754 A1* | 9/2008 | Lovett | G06Q 20/24 |
| | | | 235/380 |
| 2008/0223933 A1 | 9/2008 | Smith | |
| 2008/0288362 A1* | 11/2008 | King | G06Q 30/0283 |
| | | | 705/26.8 |
| 2009/0026267 A1 | 1/2009 | Wang et al. | |
| 2009/0057413 A1 | 3/2009 | Vinogradov et al. | |
| 2009/0072038 A1 | 3/2009 | Li et al. | |
| 2009/0140050 A1 | 6/2009 | Liu et al. | |
| 2010/0044436 A1 | 2/2010 | Powell et al. | |
| 2010/0044440 A1 | 2/2010 | Wang et al. | |
| 2010/0078477 A1 | 4/2010 | Wang et al. | |
| 2010/0089992 A1* | 4/2010 | Kitada | G06Q 10/00 |
| | | | 235/375 |
| 2010/0108769 A1 | 5/2010 | Wang et al. | |
| 2010/0147956 A1 | 6/2010 | Wang et al. | |
| 2010/0287057 A1* | 11/2010 | Aihara | G06K 7/1095 |
| | | | 705/16 |
| 2011/0077967 A1* | 3/2011 | Kapu | A61B 5/14532 |
| | | | 705/3 |
| 2011/0101086 A1* | 5/2011 | Yach | G06Q 10/10 |
| | | | 235/375 |
| 2011/0163165 A1 | 7/2011 | Liu et al. | |
| 2011/0174880 A1 | 7/2011 | Li et al. | |
| 2012/0000982 A1 | 1/2012 | Gao et al. | |
| 2012/0111944 A1 | 5/2012 | Gao et al. | |
| 2012/0138684 A1 | 6/2012 | Van Volkinsburg et al. | |
| 2012/0153022 A1 | 6/2012 | Havens et al. | |
| 2012/0193429 A1 | 8/2012 | Van Volkinsburg et al. | |

FOREIGN PATENT DOCUMENTS

| | | |
|---|---|---|
| JP | 2005228157 A | 8/2005 |
| JP | 3988547 B2 | 7/2007 |

OTHER PUBLICATIONS

Sep. 29, 2011 Written Opinion in International Application No. PCT/CN2010/001998.

Examination Report in counterpart GB Application No. 1309054.3 dated Mar. 23, 2017, pp. 1-5.

Examination Report in counterpart GB Application No. 1309054.3 dated Oct. 12, 2017, pp. 1-5.

Examination Report in related GB Application No. 1309054.3 dated Jan. 26, 2018, pp. 1-7.

Combined Search Report in related GB Application No. 1721380.2 dated Jan. 26, 2018, pp. 1-3.

* cited by examiner

US 10,311,424 B2

INDICIA ENCODING SYSTEM WITH INTEGRATED PURCHASE AND PAYMENT INFORMATION

FIELD OF THE INVENTION

The present invention relates in general to machine readable indicias, and more particularly to machine readable indicias that encode information.

BACKGROUND

Indicia reading terminals are available in a variety of types. An indicia reading terminal or barcode reading terminal can be operative to read decodable indicia such as barcodes. Indicia reading terminals for reading decodable indicia are available in multiple varieties. For example, indicia reading terminals are common in point of sale applications. Indicia reading terminals may have a keyboard and a display. In a keyboard and display equipped indicia reading terminal, a trigger button for actuating the output of decoded messages is typically provided in such locations as to enable actuation by a thumb of an operator. Some indicia reading terminals are adapted to read bar code symbols including one or more of one dimensional (1D) bar codes, stacked 1D bar codes, and two dimensional (2D) bar codes. Other indicia reading terminals are adapted to use optical character recognition (OCR) to read standard characters while still other indicia reading terminals are equipped to read both bar code symbols and OCR characters.

The discussion above is merely provided for general background information and is not intended to be used as an aid in determining the scope of the claimed subject matter.

SUMMARY

An indicia encoding system is disclosed herein that encodes integrated information on products and/or services selected for purchase and payment information for purchasing the selected products and/or services, in accordance with a variety of embodiments involving various methods, devices and systems. In one illustrative embodiment, a method may include entering purchase order information via one or more input/output components. The purchase order may include an indication for one or more products and/or one or more services. The method may also include entering payment information, including information on a method of payment, via one or more input/output components. The method may also include generating a machine-readable indicia that encodes both the purchase order information and the payment information, with the payment information in an encrypted form; and displaying the machine-readable indicia on a screen.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of various illustrative embodiments. In the drawings, like numerals are used to indicate like parts throughout the various views.

DETAILED DESCRIPTION OF ILLUSTRATIVE EMBODIMENTS

Figure 1:
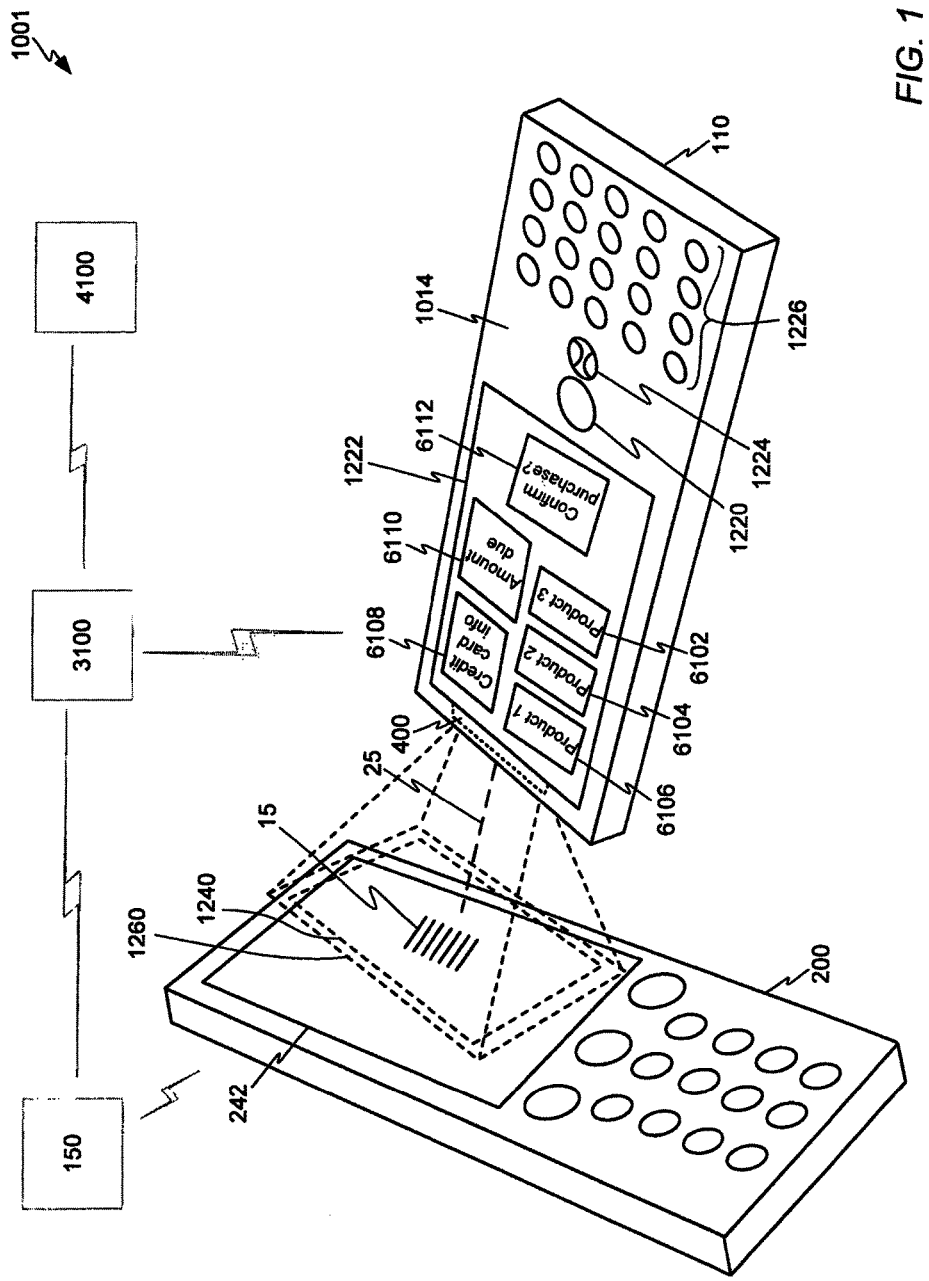
FIG. 1 depicts a perspective view of a system including an indicia reading terminal reading an indicia on a screen of a digital device, among other system resources depicted in block diagram, in accordance with an illustrative embodiment.

FIG. 1 depicts a perspective view of a system 1001 including an indicia reading terminal 110 reading a machine-readable indicia 15 that is displayed on a screen 242 of a digital device 200, in accordance with an illustrative embodiment. A simplified view of additional system resources are depicted in the background in block diagram format, illustratively including store website server 3100, store checkout computer system 150, and financial institution server 4100. The machine-readable indicia 15 may illustratively be generated at least in part by an application running on digital device 200, and that may be used to integrate purchase order information and payment information into a single, integrated purchasing indicia, such as a barcode, for example. Generating and displaying machine-readable integrated purchasing indicias provides advantageous and efficient methods in contexts such as shopping, for example.

Figure 2:
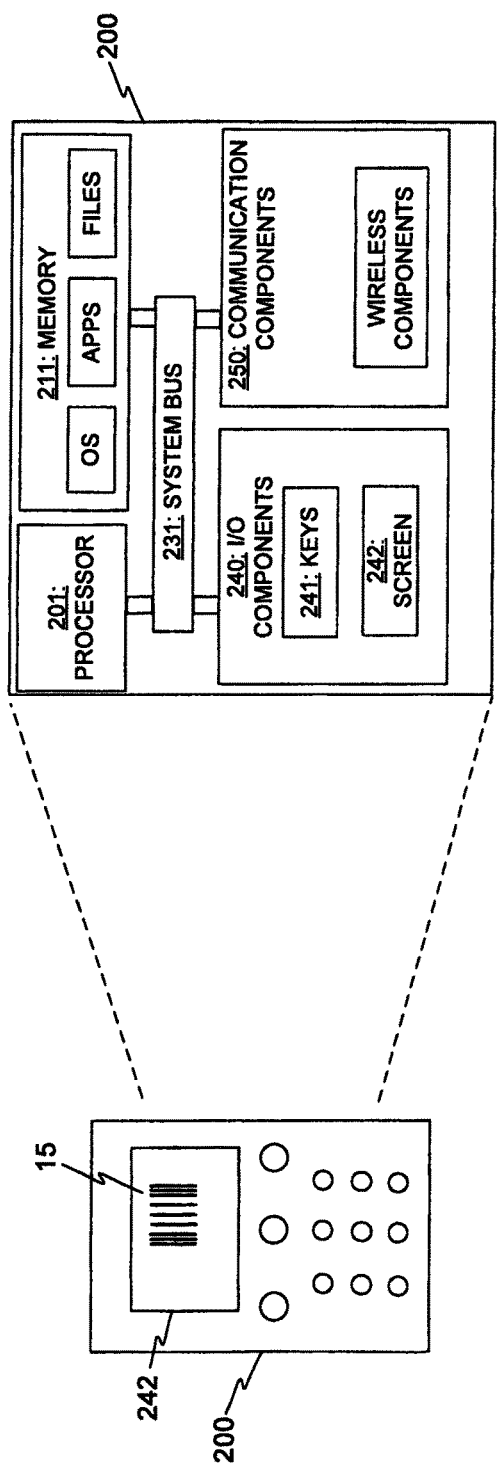
FIG. 2 depicts a block diagram of a digital device, in accordance with an illustrative embodiment.
Figure 3:
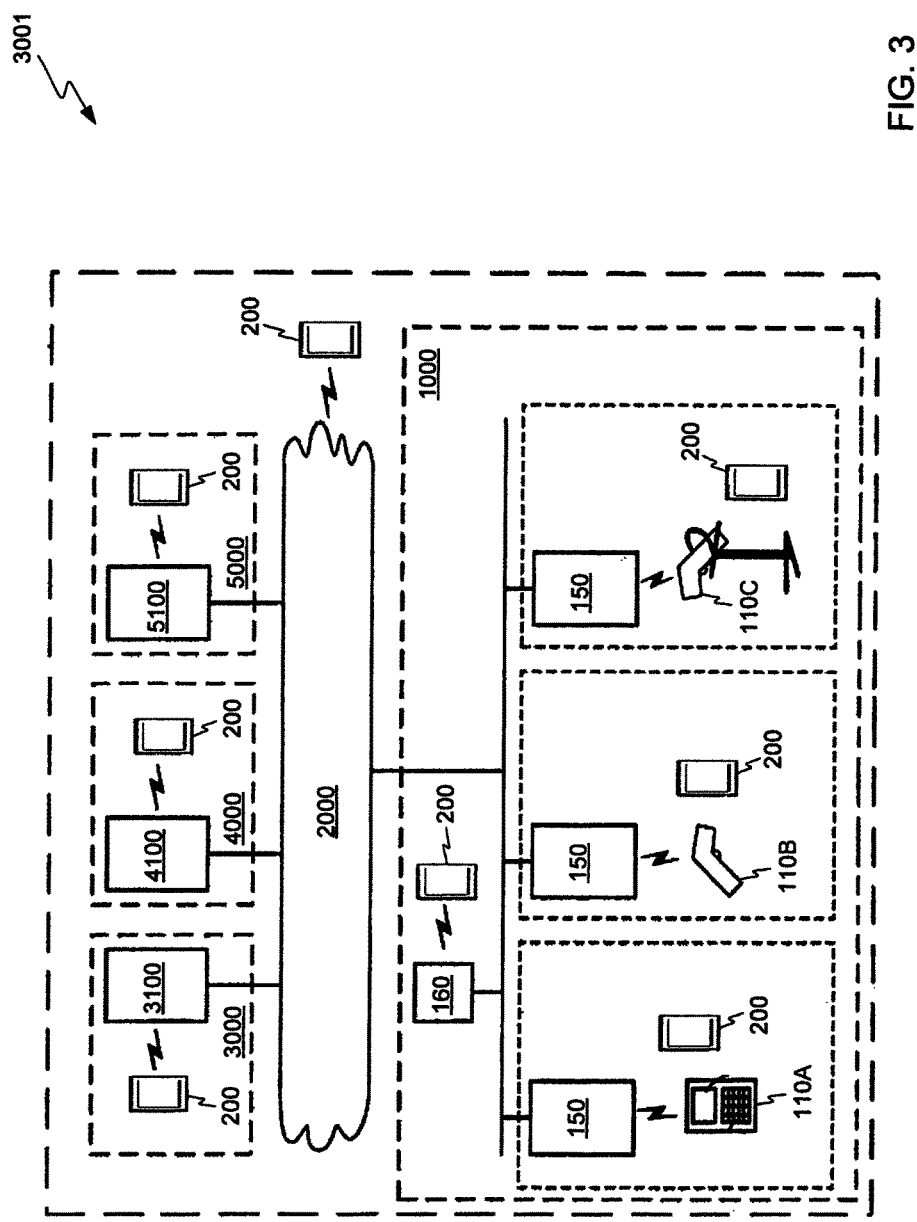
FIG. 3 depicts a block diagram of a system including multiple indicia reading terminals and multiple digital devices, among other digital resources, in accordance with an illustrative embodiment.
Figure 4:
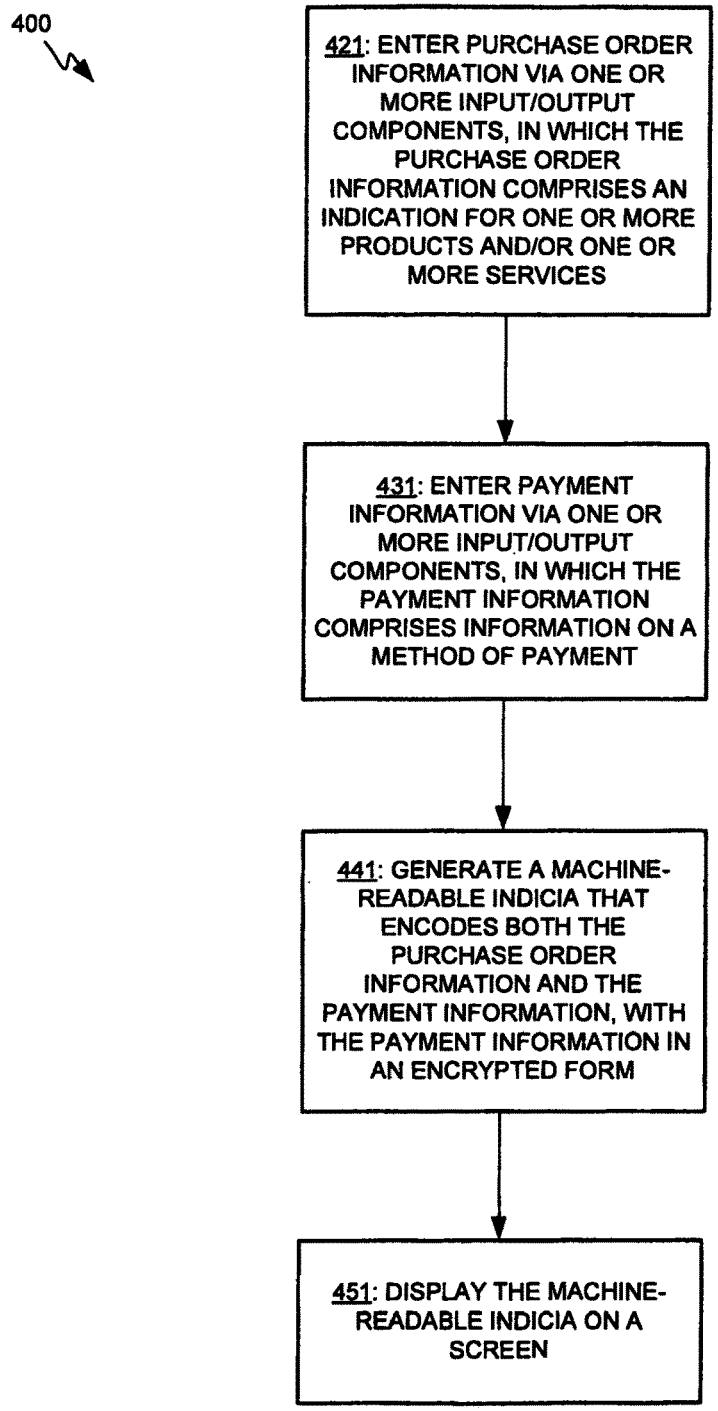
FIG. 4 depicts a flowchart for a method, in accordance with an illustrative embodiment.
Figure 5:
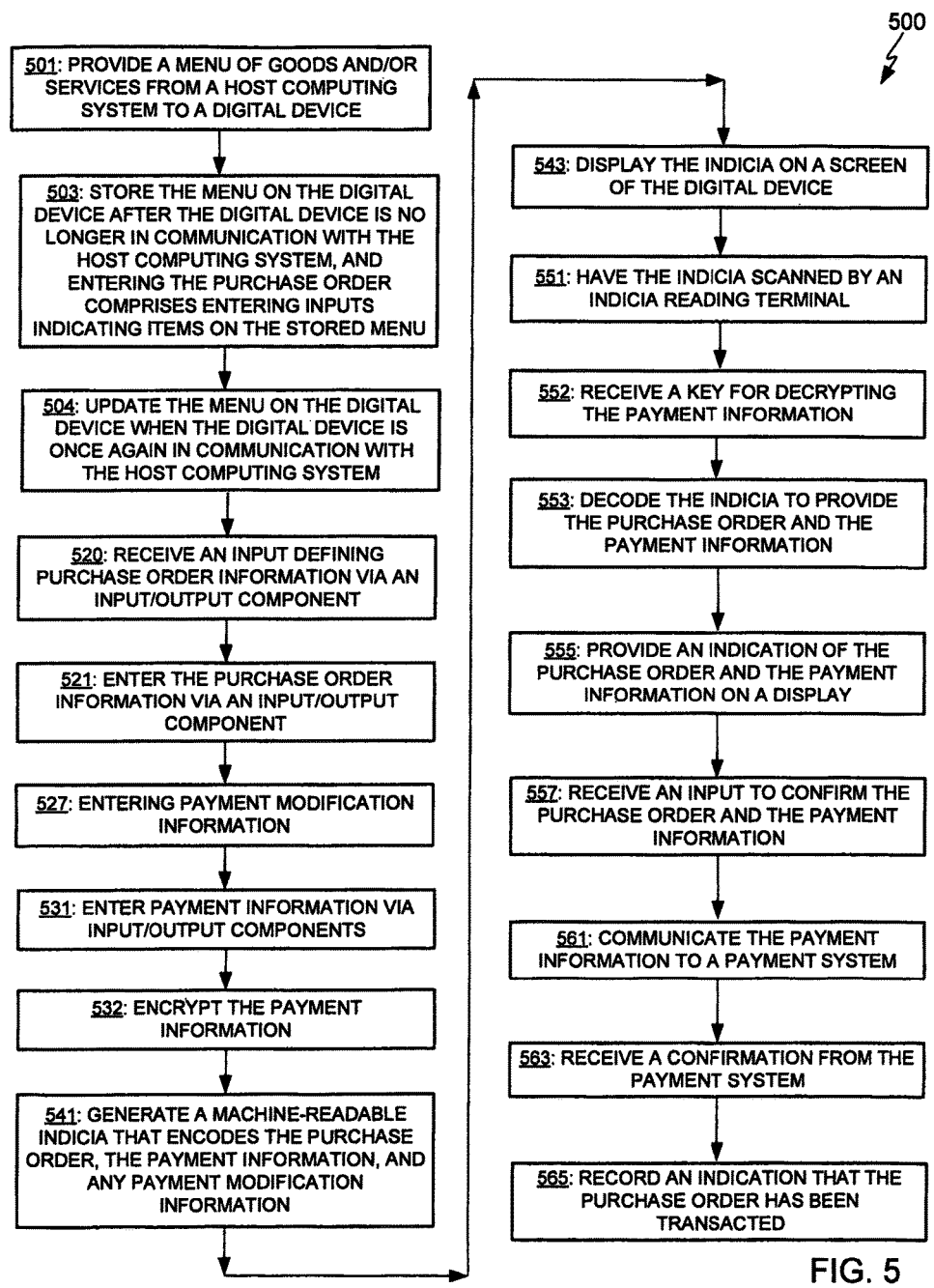
FIG. 5 depicts a flowchart for a method, in accordance with an illustrative embodiment.
Figure 6:
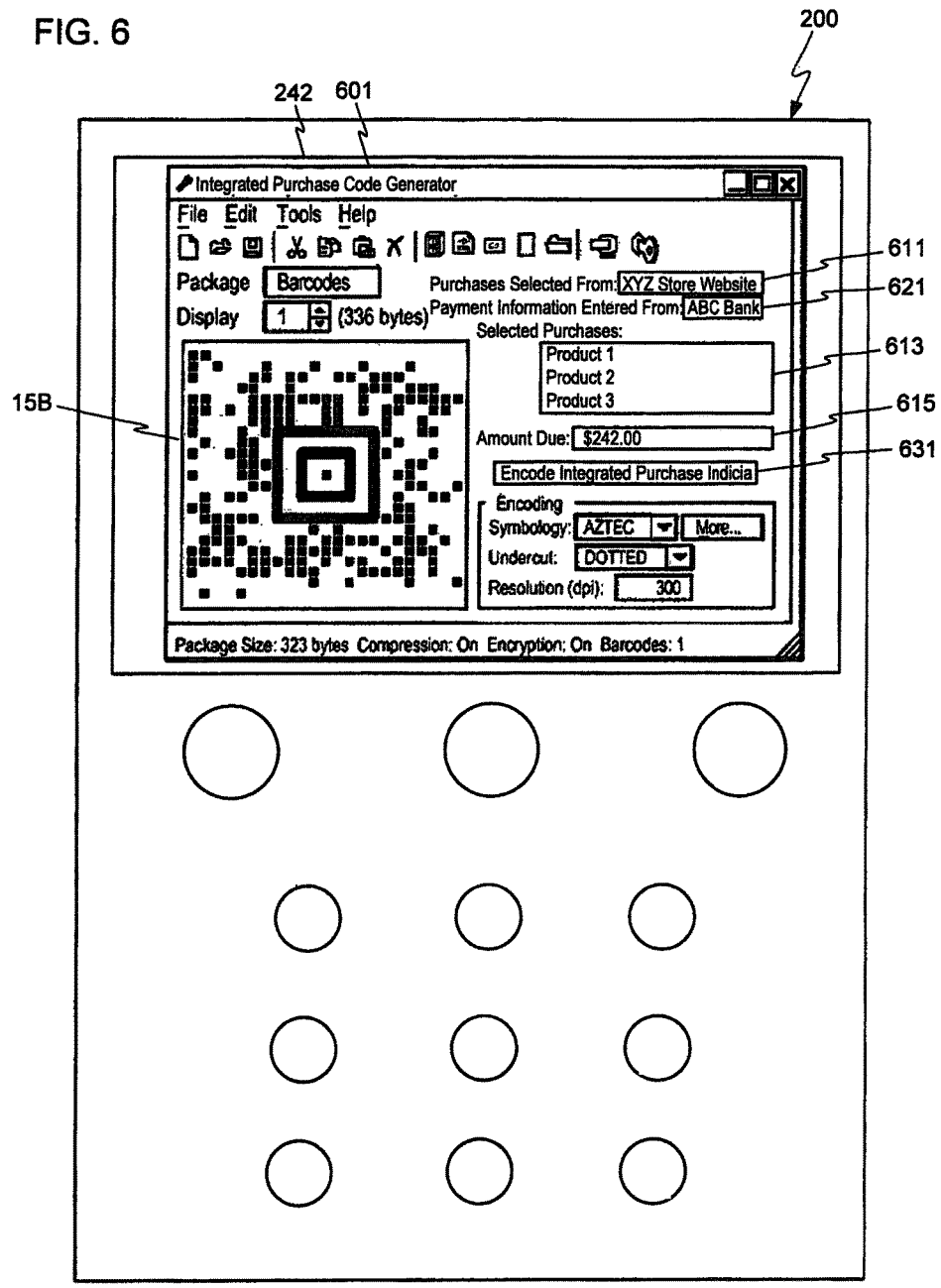
FIG. 6 depicts a top plan view of a digital device with its screen displaying a user interface for generating integrated purchase indicias, in accordance with an illustrative embodiment.

The embodiment of FIG. 1 can be better understood with reference also to FIGS. 2-6. Certain features and elements of FIG. 1 are introduced and described further below after relevant aspects of these subsequent figures are first discussed. FIG. 2 depicts a block diagram of digital device 200, in accordance with an illustrative embodiment that corresponds with digital device 200 as shown in FIG. 1. FIG. 3 depicts a block diagram of a system 3001 including multiple indicia reading terminals 110A-C and multiple digital devices 200, among other digital resources, in accordance with an illustrative embodiment. FIG. 4 depicts a flowchart for a basic method 400 involved in using an integrated purchase indicia application on a digital device, in accordance with an illustrative embodiment that may correspond to usage of the digital device 200 as in FIG. 1. FIG. 5 depicts a flowchart for a more involved method 500 involved in using an integrated purchase indicia application on a digital device, in accordance with an illustrative embodiment that may correspond to usage of the digital device 200, indicia reading terminal 110, and other elements of system 1001 as in FIG. 1. FIG. 6 depicts a top plan view of digital device 200 with its screen 242 displaying an application user interface 601 for generating integrated purchase barcodes, such as barcode 15B, in accordance with an illustrative embodiment that may correspond to methods 400 and 500 in FIGS. 4 and 5 and to usage of digital device 200 in the embodiment of FIG. 1. Referring to FIGS. 1-6, with various indicated features depicted in various of these figures, there is set forth herein novel methods embodied in and performed by digital device 200, and by systems 1001 and 3001 in general in accordance with various embodiments.

FIG. 2 depicts an exploded sectional simplified block diagram of digital device 200, having screen 242 on which may be displayed an integrated purchase indicia 15 as in FIG. 1. Screen 242 may be a touchscreen in some embodiments, and serve as an input and output component. Digital device 200 includes one or more processors 201, one or more memory components 211, one or more input/output components 240, and one or more communication components 250, interconnected such as by a system bus 231. The one or more memory components 211 may have stored on them any of one or more operating systems, one or more applications, and one or more files, potentially among other elements. These may include an application for receiving purchase order information and payment information, which may include files or various forms of data that may be stored on one or more memory components 211, and generating or otherwise providing a machine-readable indicia that integrates the purchase order information and payment information. Such files or other data representing the purchase order information and payment information may be stored more or less transiently, short term, or long term on one or more memory components 211 and/or other associated memory resources, in various embodiments. Input/output components 240 may include components involved in a user input interface, such as keys 241 and screen 242, for example. The one or more communication components 250 may include one or more wireless communication components that may communicate with wireless resources, such as a mobile or wi-fi wireless network, for example, and thereby communicate with a store website server 3100 as depicted in FIG. 1 for accessing a store website, for example.

The various hardware components of digital device 200 may take any of a wide variety of forms in different embodiments. For example, one or more processors 201 may illustratively be or include a central processing unit (CPU), a complex programmable logic device (CPLD), an application-specific integrated circuit (ASIC), a field programmable gate array (FPGA), or any type of circuit capable of processing logic operations, in accordance with various embodiments. One or more memory components 211 may illustratively be or include any one or more of RAM, EPROM, a hard disc drive, a flash drive, or other memory elements, and one or more of any of the various types of memory components, in various embodiments.

While keys 241 and screen 242 are directed more particularly to user input/output devices, communication components 250 also serve as input/output components for digital device 200, more directed to relaying input and output from and to other communication components and digital resources, and all of input/output components 240 and communication components 250 may be considered input/output components in a broader sense, for purposes of terminology in describing various embodiments disclosed herein. For example, an illustrative embodiment may include entering a purchase order and entering payment information via one or more input/output components, where this may include a user entering inputs on keys 241 or screen 242, and may also include digital device 200, a remote retail website server, and/or a remote retail or financial services server using any of various communication components to transmit information included in the purchase order information and/or payment information, for example. Communication components 250 may illustratively include a hardwire communication input/output device such as an Ethernet device or a USB input/output communication interface device, and/or may include a wireless communication device e.g. an IEEE 802.11 communication interface device or a Bluetooth interface device, in various embodiments.

Referring to FIGS. 1 and 2, indicia reading terminal 110 may have a similar set of internal components as shown in the block diagram for digital device 200, in illustrative embodiments, including one or more processors, one or more memory components, one or more input/output components, and one or more communication components. These components may be packaged in any of a variety of form factors such as hand held housing 1014 depicted in FIG. 1, as well as tablet style and gun style form factors depicted among indicia reading terminals 110A-C in FIG. 3, for example. In the case of indicia reading terminal 110 as in FIG. 1, the input/output components may include keys 1220, 1224, 1226, display screen 1222, and an imaging subsystem 400 that may be capable of imaging frames of data, that may be stored on a memory component and processed by a processor, such as processing for attempting to decode decodable indicias represented in the image data. For example, as seen in FIG. I, imaging subsystem 400 may have a field of view 1240 around a central axis 25, and which may be supported by an illuminated area 1260 provided by an illumination subsystem (not separately depicted) of indicia reading terminal 110, which may be based on light-emitting diode (LED) illumination, for example, and which may be in one or more illumination banks each comprising multiple LEDs, in various embodiments. Terminal 110 may also refrain from providing illumination for imaging an indicia displayed on screen 242 of digital device, in an illustrative embodiment in which the native illumination of screen 242 provides for sufficient imaging resolution for high-speed imaging, for example.

In the illustrative embodiment of FIG. 1, indicia reading terminal 110 reads the machine-readable integrated purchase indicia 15 displayed on screen 242 of digital device 200 and decodes integrated purchase indicia 15, thereby providing information on a purchase order and a payment method previously entered by a user of digital device 200. Some of this information is displayed on screen 1222 of indicia reading terminal 110, where the purchase order information is represented by product graphical icons 6102, 6104, and 6106, and the payment information is represented by payment method graphical icon 6108 and amount of purchase graphical icon 6110. Screen 1222 of indicia reading terminal 110 also displays purchase confirmation graphical icon 6112. In an illustrative embodiment, a customer may present digital device 200 displaying integrated purchase indicia 15 to a retail employee bearing indicia reading terminal 110; integrated purchase indicia 15 may be scanned and decoded with indicia reading terminal 110, and the integrated purchase information displayed on indicia reading terminal 110 and presented to the customer; and the customer may review the information on indicia reading terminal 110 and then enter an input to confirm the purchase, which may illustratively include selecting the purchase confirmation graphical icon 6112 on terminal 110. This may be followed by transacting the purchase, which is elaborated on further below.

In various embodiments, terminal 110 may be part of an automated checkout station without a retail employee, for example. In various embodiments, terminal 110 may also be independent of any other retail checkout elements such as a cash register, and the purchase may be entirely transacted between the digital device 200 and the indicia reading terminal 110, either at a set checkout station or at an arbitrary location. In various embodiments, this process may also include further steps for confirming the purchase prior to transacting the purchase. For example, the customer may also be prompted to enter a security code that was generated together with the integrated purchase indicia, prior to confirming the purchase. In various embodiments, the user and/or the retail establishment may be provided the option whether or not to use such a security confirmation code together with the integrated purchase indicia for confirming the purchase.

Regarding the operation of an indicia reading terminal 110, an imaging system may include optics and focusing elements for exposing a target image onto an imaging array that may translate the image into an array of pixels, arranged by rows and columns. Terminal 110 can capture frames of image data at a rate known as a frame rate. An illustrative frame rate may be 60 frames per second (FPS) which translates to a frame time (frame period) of 16.6 milliseconds (ms), in an illustrative embodiment. Another illustrative frame rate may be 30 frames per second (FPS) which translates to a frame time (frame period) of 33.3 ms per frame, in an illustrative embodiment. Each frame period may illustratively include preliminary operations to an exposure, performing the exposure itself and associated simultaneous operations, and operations after the exposure. Once an image is finished exposing, the imaging array may transfer image data based on the ordered rows of pixels as a frame of image data to be temporarily stored in a buffer memory such as a RAM which is then addressed by a processor.

The processor may attempt to decode an indicia, such as a one-dimensional or two-dimensional barcode. The processor may process image data of the frame corresponding to a line of pixel positions (e.g., a row, a column, or a diagonal set of pixel positions) to determine a spatial pattern of dark and light cells and convert each light and dark cell pattern determined into a character or character string via table lookup, as an illustrative example. Where a decodable indicia representation is a 2D barcode symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup, as an illustrative example.

FIG. 3 depicts a block diagram of a digital retail system 3001 in accordance with an illustrative embodiment. Digital retail system 3001 may include retail facility 1000, where there may be disposed a plurality of indicia reading terminals 110A-C in accordance with various embodiments, including tablet form factor terminal 110A, gun style form factor terminal 110B, and fixed mount housing form factor terminal 110C, as illustrative examples. In one example, retail facility 1000 can be provided by a local retail store. At retail facility 1000 there can be included checkout station servers 150 and retail facility server 160. Checkout station servers 150 may illustratively be configured as cash registers. Facility server 200 may illustratively be configured as a retail store server.

Terminals 110, checkout station servers 150 and retail facility server 160 can be in communication with various remote servers via network 2000 which can be e.g. a TCP/IP network, which may be in at least intermittent communicative connection with various other servers, digital devices, terminals, or other digital resources through any variety of wired and/or wireless infrastructure and any combination of communication protocols. Server 3100 can be a server maintained by a retail business entity retailing products at retail facility 1000 and can be disposed at business entity facility 3000. Server 4100 can be server maintained by a financial institution, such as a bank, a credit union, a credit card operator, or a third-party payment and/or money transfer service, operating at financial institution facility 4000. Server 5100 can be a server maintained by a thirdparty website entity 5000 that may provide sales and promotion services to encourage customers to make purchases at a separate retail business entity such as retail facility 1000.

There can also be included in system 3001 one or more client digital devices 200A-C (referred to in general as digital device 200). A digital device 200 of system 3001 can be operative to run an application that allows a user to enter purchase order information and financial information and generate a machine-readable indicia that integrates the purchase order information and payment information. Digital device 200 in various embodiments may be a portable, hand held device. Digital device 200 in various embodiments may be a smartphone illustratively such as an IPHONE series model by Apple Inc., a DROID series model by Motorola, Inc., or a BLACKBERRY series model by Research in Motion Limited, for example. Digital device 200 in various other embodiments may be e.g. an e-book reader such as a KINDLE series model by Amazon.com, Inc. or a NOOK series model by Barnes & Noble, Inc., for example. Digital device 200 in various other embodiments may be a portable, hand held indicia reading scanner or mobile computer. Digital device 200 in various other embodiments may be e.g. any of a wide variety of laptop personal computers, netbook personal computers, tablet personal computers, or desktop personal computers, for example. In different embodiments an integrated purchase indicia system 3001 can include any or all of these varieties as well as many other varieties of digital devices that are capable of participating in steps of receiving or storing purchase order information and payment information, encoding the combined purchase order and payment information in a machine-readable integrated purchase indicia, and displaying the machine-readable integrated purchase indicia.

In different embodiments an integrated purchase indicia system 3001 can include anywhere from a single digital device 200 to very large numbers of digital devices 200 and indicia reading terminals 110. As depicted in FIG. 3, digital devices 200 may also communicate directly with various computing resources in system 3001. As an illustrative example, a digital device may communicate with retail facility server 160, retail business entity server 3100, or third-party website server 5100, any of which may provide information to digital devices 200 on products and/or services available for purchase. Digital devices 200 and/or any of the computing resources associated with business entities or third-party websites as indicated herein may also communicate with financial institution server 4100 for providing or confirming payment information and/or executing a payment for transacting a purchase, for example.

In the illustrative embodiment depicted in FIG. 4, method 400 provides a basic embodiment of a process for creating the integrated purchase indicia. Method 400 may include step 421, of entering purchase order information via one or more input/output components, in which the purchase order information comprises any information related to an indication for one or more products and/or one or more services. For example, a user may use digital device 200 to access a retail website or a third-party website that indicates products and/or services available for purchase from a retail establishment, one or more of which the user may select for purchase.

Method 400 may further include step 431, of entering payment information via one or more input/output components, in which the payment information comprises information on a method of payment. This step of entering payment information may be done within a single shopping session or within a short span of time as the user selecting the products and/or services for purchase; or this step of entering payment information may be done at a different time or different day than when the user selects the products and/or services for purchase. For example, the user may have payment information previously stored on digital device 200, or the user may already have an account set up with a given retail establishment or third-party website with stored payment information that may be available for use with the presently selected products and/or services. In various embodiments, the user may also use multiple digital devices or computing resources to select products and/or services for purchase, to enter payment information, and to enter an input for causing an application to encode the combined purchase order information and payment information in an integrated purchase indicia. Any or all of these steps, and different parts of each step, may be performed using any combination of digital devices.

Method 400 may also include step 441, of generating a machine-readable indicia that encodes both the purchase order information and the payment information, with at least the payment information in an encrypted form. Part or all of the purchase order information and/or other information may also encrypted. The machine-readable indicia may constitute an integrated purchase indicia that encodes both the purchase order information and the payment information. The application for performing step 441 may be hosted on and executed on a personal digital device operated by the user, or may be done at least in part using any combination of remotely located computing resources that are in communicative access with a digital device used by the user making the purchase selections. For example, part or all of the process of encoding the purchase order information and the payment information may be performed by a website-hosted application or by a cloud computing resource. Step 441 may also include applying compression and/or encryption to the purchase order information and/or the payment information, and rendering the machine-readable integrated purchase indicia in a way that encodes the compressed and/or encrypted combined purchase and payment information. Method 400 may also include step 451, of displaying the machine-readable indicia on a screen.

The encryption of the payment information may involve any form of encryption, and may also involve generating a key that is required for decryption of the payment information in the machine-readable indicia. The decryption key may illustratively take the form of a personal identification number (PIN) or a digital signature, for example. The user's digital device may provide the PIN or other form of key to the user or store the PIN or other form of key, for use at the point of purchase. The user may also use a single PIN for all transactions with the form of payment encoded in the integrated purchase indicia, and this PIN may be used to decrypt the payment information encrypted in the integrated purchase indicia, for example.

For example, a user may first make product selections with her digital device. This may include any combination of taking pictures of bar codes on products, either at home, at a store, or elsewhere, or making selections on a website. The digital device may then combine the information on the selected products with payment information, which may be stored on the digital device, or retrieved from a server of the user's financial institution, or entered by the user, for example, and generate a single, integrated purchase and payment indicia that encodes information on the products and/or services selected for purchase, and an encoded form of the payment information, along with a separate key, such as a PIN. The user may then go a checkout station at a store, and have the digital device display the integrated purchase and payment indicia on a screen of the digital device, to be scanned by a point-of-sale indicia scanning terminal of the store. The user may then also enter the key, such as by entering the PIN at the checkout station, which allows the payment information from the integrated purchase and payment indicia to be used for executing a payment. One substantial illustrative advantage of this method is that it provides a convenient, fast and secure method of making a purchase within the context of traditional point-of-sale infrastructure, and does not require widespread adoption of novel point-of-sale infrastructure elements such as smart card readers, for example.

FIG. 6 depicts a top plan view of a digital device 200 with its screen 242 displaying a graphical user interface application window 601 for generating integrated purchase indicias, in accordance with an illustrative embodiment that further illustrates aspects of method 400 of FIG. 4 in one example. In the state depicted in FIG. 6, a user has already selected one or more goods and/or services, with those selections forming at least part of a set of purchase order information that is stored at least transiently on at least one memory component, whether a memory component comprised in digital device 200, a retail website server, or some other computing resource. A user may have made the selections in one shopping session, or may have made the selections in one or more previous shopping sessions and had the selections saved in a checkout, a virtual shopping cart, a preselected default list or set of favorites, or a wishlist, for example. The purchase order information is represented in the graphical user interface application window 601 of FIG. 6 by retail store indicator graphical icon 611, purchase selection graphical icon 613, and amount due graphical icon 615.

As depicted in FIG. 6, payment information is also entered, such as a credit or debit card number and associated required information or payment service account number and associated required information. This payment information may have been entered by the user within one or more same shopping sessions during which the purchase selections were made, or may be stored in digital device 200, or another payment resource associated with the user, or by the relevant retail company or third-party website in connection with an account associated with the user, for example. The payment information is represented in the graphical user interface application window 601 of FIG. 6 by payment information graphical icon 621, which represents, though not explicitly showing, all required information to transact a purchase with, for example, a credit or debit card issued by the financial institution with which the user has an account of the relevant type. The payment information may also include an amount to be paid, which corresponds with the amount due from the purchase order information, as represented in amount due graphical icon 615 in graphical user interface application window 601 of FIG. 6.

As further depicted in FIG. 6, graphical user interface application window 601 includes a graphical icon or widget 631 indicating an input to encode an integrated purchase indicia that encodes all necessary information from both the purchase order information and the payment information in a single indicia. In the state as depicted, a user has selected the encode widget 631, an integrated purchase indicia has been encoded and is displayed as machine-readable integrated purchase indicia 15B in the illustrative embodiment of FIG. 6. As illustratively depicted in FIG. 6, the machine-readable integrated purchase indicia 15B is rendered as an Aztec Code two-dimensional barcode. The integrated purchase indicia may be rendered in any of a variety of machine-readable indicias in different embodiments, including one-dimensional and two-dimensional barcodes in any pertinent encoding protocol, or any type of coding system or encoded character set that is amenable to machine-readable decoding or optical character recognition in various embodiments.

In one illustrative embodiment, both the purchase order information and the payment information can be included in a single document that is incorporated in an extensible markup language (XML) file. When a user selects the encode widget 631 in graphical user interface application window 601 of FIG. 6, such as by touching it on a touchscreen or clicking on it with a mouse-controlled or touchpad-controlled pointer, for example, the single XML file containing both the purchase order information and the payment information can be encoded as a single machine-readable indicia 15B, such as the two-dimensional barcode as shown in FIG. 6.

An indicia reading terminal may scan the indicia 15B directly from the screen 242 of digital device 200. Indicia 15B may also be saved as a file and transmitted or communicated electronically to other devices or computing resources. For example, indicia 15B may be saved as a PNG, TIF, GIF, or JPG file type. Indicia 15B may also be copied or cut and then pasted into a different program such as any of a variety of productivity software programs, such as a word processing program, a spreadsheet program, a graphics editing program, or a diagramming program, for example.

FIG. 5 depicts method 500 according to an illustrative embodiment that includes additional detail on a process for both creating an integrated purchase indicia and using the integrated purchase indicia for transacting a purchase, and that may be used in association with the embodiments of FIGS. 1-4 and 6 as depicted and described herein according to various embodiments. Although the steps are depicted in a certain order in the illustrative embodiment of FIG. 5, different steps may be performed in any order in various embodiments, and any combination of the steps depicted and described may be performed in various embodiments.

For example, method 500 may include step 501, of providing a menu of goods and/or services from a host computing system to a digital device. The menu may be provided via at least one of one or more input/output components, in which the menu is hosted by a host computing system that is external to a digital device that comprises the at least one user input/output component on which the menu is provided, in various illustrative embodiments.

Method 500 may also include step 503 in which the menu is stored on the digital device after the digital device is no longer in communication with the host computing system, and entering the purchase order comprises entering inputs indicating items on the stored menu. Method 500 may also include step 504 in which the menu is updated on the digital device when the digital device is once again in communication with the host computing system. For example, the host computing system may include a server, the menu may be provided on a website hosted at least in part by the server, and at least some information on which the menu is based may be provided using one or more wireless communication components from the server to the digital device.

Method 500 may also include step 520, of receiving inputs defining the purchase order via at least one input/output component, and step 521, of entering the purchase order via at least one input/output component. These steps may include the same actions or distinct actions, may involve user input/output components and/or communication input/output components, and may be performed by the same or different components comprised in a single device or multiple devices or elements within a system. As illustrative examples, entering the purchase order may include a user making one or more selections through one or more user input/output components such as keys, a touchscreen, a pointer (such as a mouse-controlled pointer) within a graphical user interface, or a voice user interface. As another illustrative example, entering the purchase order may include recording or storing the user selections at least transiently on one or more memory components of a digital device used by the user.

As yet another illustrative example, the one input/output components may include at least one imaging component, and method 500 may include receiving image data via the imaging component, decoding the image data to extract an indication for at least one of the one or more products and/or one or more services, and using the indication extracted from the image data for defining the purchase order information. For example, a user may use a camera or other imaging feature on the user's digital device, in a shopping mode, to take a picture of or otherwise image a physical product that has a machine-readable indicia on it, such as a bar code, or characters readable with optical character recognition (OCR). As another example, the user may take an image of a machine-readable indicia on a physical sign or a physical menu indicating one or more products or services. The digital device may then extract the machine-readable indicia from the image data and decode the indicia to provide information on the product. This product information may then, alone or in combination with other product information for other products and/or services, be taken as the purchase order information, and combined with payment information for subsequent encoding into the integrated purchase and payment indicia.

As further illustrative examples, entering the purchase order may include providing the user selections from a digital device being used by the user via one or more communication components to one or more external digital resources such as a retail website server or third-party website server and/or any communication component involved in transmitting that information from the user's digital device to an external server, such as communication infrastructure or other elements associated with a wi-fi network or a TCP/IP network, for example. Step 521 may also include different parts that are all included as different aspects of entering any information incorporated into a purchase order, such as initially entering one or more elements of payment information into a digital device or a retail or third-party website, and on a different occasion, accessing and at least transiently storing one or more elements of payment information by or on any component involved in generating, displaying, decoding, or using an integrated payment indicia incorporating the payment information, in different embodiments.

Method 500 may also include step 527, of entering payment modification information, which may be done via one or more input/output components. The payment modification information may include information on an authorized modification of a payment amount, such as a coupon, a discount, or a redemption of points from a rewards program, in various examples. Such a payment modification may be offered directly by a retailer from which the one or more goods and/or services are ordered, or may be part of a promotion or deal offered by a third-party website or vendor that may provide sales and/or promotions by contract or other arrangement with the retailer. Such a payment modification may also include information on a relevant tax such as a sales tax, an excise tax, or a VAT tax, for example. The machine-readable indicia may also encode the payment modification information into the single integrated purchase indicia, in addition to the purchase order and the payment information.

Method 500 may also include step 531 of entering payment information via at least one input/output component, as described herein. Step 531 may also be done in any order relative to step 521 of entering the purchase order in different embodiments. Step 531 may also include any one or different parts that are all included as different aspects of entering payment information, such as initially entering one or more elements of payment information into a digital device or a retail or third-party website, and on a different occasion, accessing and at least transiently storing one or more elements of payment information by or on any component involved in generating, displaying, decoding, or using an integrated payment indicia incorporating the payment information, in different embodiments. Step 531 may also include or be followed by step 532 of encrypting the payment information, for example.

Method 500 may also include step 541 of generating a machine-readable indicia that encodes both the purchase order information, the payment information, and any additional information such as any pertinent payment modification information, for example. This may include encrypting at least the payment information, and potentially also encrypting information on the products or services selected for purchase, or information on modifying the payment amount, such as for a coupon or a customer rewards program, for example. This may include steps performed using one or more processors executing an application, which may include one or more processors on a personal digital device 200, or one or more processors in external digital resources or at other locations such as in a retail or third-party website server, for example. Method 500 may further include step 543, of displaying the indicia on a screen of the digital device.

Method 500 may also include step 551 of having the indicia scanned by an indicia reading terminal. This may include the indicia being scanned by at least one imaging component of the indicia reading terminal. This may in an illustrative embodiment be followed by step 552, of receiving a key for decrypting the payment information. This may illustratively include the user entering a PIN that is used to decrypt the payment information encoded in the integrated purchase indicia, for example. This may be followed by step 553, of decoding the indicia to provide the purchase order and the payment information. This may be done using a processor of the indicia reading terminal, for example. Method 500 may also include step 555, of providing an indication of the purchase order information and the payment information on a display, such as a display on the indicia reading terminal, or a display of a checkout station associated with the indicia reading terminal, or the display of the originating digital device on receiving the requisite data from the indicia reading terminal, in various illustrative embodiments. Method 500 may further include step 557, of receiving an input to confirm the purchase order information and the payment information, such as described above with reference to FIG. 1, for example.

Method 500 may also include step 561, of communicating the payment information to a payment system; step 563, of receiving a confirmation from the payment system; and step 565, of recording an indication that a purchase corresponding to the purchase order information has been transacted. This may illustratively involve confirming, using the payment system, that the payment information is valid and is sufficient to execute a payment, in which the confirmation from the payment system comprises an indication that the payment information is valid and is sufficient to execute the payment. This may also illustratively involve communication with a financial institution server and execution of a payment made by credit card transaction, debit card transaction, electronic funds transfer, or using some other payment system, based on the payment information. This may also include receiving a confirmation from the financial institution that the payment has been executed. It may also include a retail entity server communicating a confirmation that a payment has been received. Recording the indication that the purchase has been transacted may include generating a receipt, which may be printed out, or may be communicated in an electronic form to the user's digital device 200, in various embodiments.

In another illustrative embodiment, a method may also include storing user inputs indicating one or more goods and/or services from a menu as favorites, and when a new purchase order is initiated, initially populating the purchase order with the one or more goods and/or services indicated as favorites. A method in accordance with this embodiment may also include communicating the indicated favorites and information on a user associated with the indicated favorites from a digital device to a host computing system. Based on this information, this method may include generating at least one of: recommendations for additional menu items based on the indicated favorites; or payment modification information comprising information on an authorized modification of a payment amount based on the indicated favorites. The recommendations and/or the payment modification information may then be communicated to the digital device.

A small sample of illustrative devices, systems, apparatuses, or methods that are described herein is as follows:

A 1. A method comprising:
 entering purchase order information via one or more input/output components, in which the purchase order information comprises an indication for one or more products and/or one or more services;
 entering payment information via one or more input/output components, in which the payment information comprises information on a method of payment;
 generating a machine-readable indicia that encodes both the purchase order information and the payment information, with the payment information in an encrypted form; and
 displaying the machine-readable indicia on a screen.

A2. The method of A1, in which the one or more input/output components comprise at least one user input component comprised in a digital device that also comprises the screen, the method further comprising receiving user inputs defining the purchase order information via the at least one user input component.

A3. The method of A1, in which the one or more input/output components comprise at least one imaging component, the method further comprising receiving image data via the imaging component, decoding the image data to extract an indication for at least one of the one or more products and/or one or more services, and using the indication extracted from the image data for defining the purchase order information.

A4. The method of A1, in which the machine-readable indicia comprises a one-dimensional or two-dimensional bar code which is displayed on the at least one screen.

A5. The method of A1, further comprising:
providing a menu of goods and/or services via at least one of the one or more input/output components, in which the menu is hosted by a host computing system that is external to a digital device that comprises the at least one user input/output component on which the menu is provided; and
receiving user inputs defining the purchase order information via at least one of the one or more input/output components.

A6. The method of A5, in which the host computing system comprises a server, the menu is provided on a website hosted at least in part by the server, and at least some information on which the menu is based is provided using one or more wireless communication components from the server to the digital device.

A7. The method of A1, further comprising:
having the indicia scanned by at least one imaging component; and
using a processor, decoding the indicia to provide the purchase order information and the payment information;
providing an indication of the purchase order information and the payment information on a display; and
receiving an input to confirm the purchase order information and the payment information.

A8. The method of A7, further comprising:
communicating the payment information to a payment system;
receiving a confirmation from the payment system; and
recording an indication that a purchase corresponding to the purchase order information has been transacted.

A9. The method of A8, further comprising executing a payment using the payment system and based on the payment information, in which the confirmation from the payment system comprises a confirmation that the payment has been executed.

A10. The method of A8, further comprising confirming, using the payment system, that the payment information is valid and is sufficient to execute a payment, in which the confirmation from the payment system comprises an indication that the payment information is valid and is sufficient to execute the payment.

A11. The method of A10, further comprising:
communicating the purchase order information and the payment information from a first digital device to a second digital device;
generating the machine-readable indicia using the processor comprised in the second digital device; and
communicating the machine-readable indicia from the second digital device to the first digital device;
in which the at least one screen on which the indicia is provided is comprised in the first digital device.

A12. The method of A1, further comprising:
entering payment modification information via one or more input/output components, in which the payment modification information comprises information on an authorized modification of a payment amount; and
in which the machine-readable indicia further encodes the payment modification information in addition to the purchase order information and the payment information.

A13. The method of A1, further comprising storing user inputs indicating one or more goods and/or services from a menu as favorites, and when a new purchase order is initiated, initially populating the purchase order with the one or more goods and/or services indicated as favorites.

A14. The method of A13, further comprising:
communicating the indicated favorites and information on a user associated with the indicated favorites from a digital device to a host computing system;
generating at least one of: recommendations for additional menu items based on the indicated favorites; or payment modification information comprising information on an authorized modification of a payment amount based on the indicated favorites; and
communicating the at least one of the recommendations or the payment modification information to the digital device.

A15. The method of A1, further comprising providing the purchase order information and the payment information in a single extensible markup language (XML) file, and encoding the XML file into a machine-readable indicia.

A16. The method of A1, further comprising generating a key that is required for decryption of the payment information in the machine-readable indicia.

A17. The method of A16, in which the key comprises a personal identification number.

A18. A system comprising:
one or more system components, each of which comprises:
one or more processors;
one or more memory components; and
one or more input/output components;
in which executable instructions are stored on at least one of the one or more memory components, in which the instructions when executed make the system capable of:
receiving a purchase order, via at least one of the one or more input/output components;
receiving payment information, via at least one of the one or more input/output components;
using at least one of the one or more processors, generating a machine-readable indicia that encodes both the purchase order and the payment information, with the payment information in an encrypted form; and
providing the indicia via at least one of the one or more input/output components.

A 19. The system of A 18, in which the system is further capable of:
having the indicia scanned by at least one imaging component;
using a processor, decoding the indicia to provide the purchase order and the payment information;
providing an indication of the purchase order and the payment information on a display;
providing a user prompt to input a key to confirm a purchase in accordance with the indication of the purchase order and the payment information; and
receiving an input to confirm the purchase.

A20. The system of A19, in which the system is further capable of:

communicating the payment information to a payment system;

executing a payment through the payment system; and recording an indication that the purchase order has been transacted.

A21. The system of A18, in which the one or more system components comprises a first digital device and a second digital device, and the system is further capable of:

communicating the purchase order and the payment information from the first digital device to the second digital device;

generating the machine-readable indicia using the processor comprised in the second digital device; and communicating the machine-readable indicia from the second digital device to the first digital device; and displaying the machine-readable indicia on a screen comprised in the first digital device.

A22. A method comprising:

entering purchase order information via one or more input/output components of a digital device, in which the purchase order information comprises an indication for one or more products and/or one or more services;

entering payment information via one or more input/output components of the digital device, in which the payment information comprises information on a method of payment;

generating a machine-readable indicia that encodes both the purchase order information and the payment information, with the payment information in an encrypted form; and presenting the machine readable indicia displayed on a screen of the digital device to an indicia reading terminal that scans and decodes the machine readable indicia to provide the purchase order information and the payment information; and transacting a purchase based on the purchase order information and the payment information.

While the present invention has been described with reference to a number of specific embodiments, it will be understood that the scope of the invention is not limited to any particular embodiments or combination of embodiments or elements discussed above ore depicted in the figures. Further, while in numerous cases herein wherein devices, systems, apparatuses, or methods are described as having a certain number of elements, it will be understood that such devices, systems, apparatuses, or methods can be practiced with fewer than or greater than the illustratively indicated certain number of elements. For example, where any claimed embodiment may recite a feature or at least one feature, that embodiment may also comprise more than one of that feature. Also, while a number of particular embodiments have been described, it will be understood that features and aspects that have been described with reference to each particular embodiment can be used in any combination with features and aspects of any other embodiment.

What is claimed is:

1. A method comprising:

a computer receiving purchase order information via one or more input/output components, in which the purchase order information comprises information about one or more products and/or one or more services selected for purchase;

the computer receiving payment information via the one or more input/output components, in which the payment information comprises information pertaining to a method of payment, the information pertaining to the method of payment being configured for use in a purchase transaction for the purchase order information;

the computer generating one machine-readable indicia that encodes each of (i) the purchase order information, (ii) the information pertaining to the method of payment that is configured for use in the purchase transaction for the purchase order information, with the payment information in an encrypted form, and (iii) a key that is required for decrypting the encrypted payment information in the machine-readable indicia, the key comprising a personal identification number, the method further comprising:

the computer encrypting the payment information and generating the key that is required for decrypting the encrypted payment information in the machine-readable indicia; and the computer displaying the machine-readable indicia on a screen in a manner configured to allow an indicia reading terminal to scan and decode the machine-readable indicia to provide the purchase order information, the encrypted payment information, and the key that is required for decrypting the encrypted payment information in the machine-readable indicia to provide the purchase order information and payment information so that a payment for a purchase of the one or more products and/or one or more services may be transacted.

2. The method of claim 1, in which the one or more input/output components comprise at least one user input component, the method further comprising receiving user inputs defining the purchase order information via the at least one user input component.

3. The method of claim 1, in which the indicia reading terminal comprises at least one imaging component, the method further comprising receiving image data via the imaging component, the machine-readable indicia represented in the image data, the indicia reading terminal scanning and decoding the image data to extract an indication for at least one of the one or more products and/or one or more services, and using the indication extracted from the image data for defining the purchase order information.

4. The method of claim 1, in which the machine-readable indicia is a one-dimensional or two-dimensional bar code which is displayed on the screen.

5. The method of claim 1, further comprising:

receiving a menu of goods and/or services via at least one of the one or more input/output components, in which the menu is hosted by a host computing system that is external to the computer; and receiving user inputs defining the purchase order information via at least one of the one or more input/ output components.

6. The method of claim 5, in which the host computing system comprises a server, the menu is provided on a website hosted at least in part by the server, and at least some information on which the menu is based is received using one or more wireless communication components from the server to the computer comprising a digital device.

7. The method of claim 1, further comprising:

having the indicia scanned by at least one imaging component of the indicia-reading terminal to decode the indicia to provide the purchase order information and the payment information;

providing an indication of the purchase order information and the payment information on the screen; and receiving an input to confirm the purchase order information and the payment information.

8. The method of claim 7, further comprising:
communicating the payment information to a payment system;
receiving a confirmation from the payment system; and
recording an indication that a purchase corresponding to the purchase order information has been transacted.

9. The method of claim 8, further comprising executing a payment using the payment system and based on the payment information, in which the confirmation from the payment system comprises a confirmation that the payment has been executed.

10. The method of claim 8, further comprising confirming, using the payment system, that the payment information is valid and is sufficient to execute a payment, in which the confirmation from the payment system comprises an indication that the payment information is valid and is sufficient to execute the payment.

11. The method of claim 10, wherein the computer comprises a digital device.

12. The method of claim 1, further comprising:
receiving payment modification information via one or more input/output components, in which the payment modification information comprises information on an authorized modification of a payment amount; and
in which the machine-readable indicia further encodes the payment modification information in addition to the purchase order information and the payment information.

13. The method of claim 1, further comprising storing user inputs indicating one or more goods and/or services from a menu as favorites, and when a new purchase order is initiated, initially populating the purchase order with the one or more goods and/or services indicated as favorites.

14. The method of claim 13, further comprising:
communicating the indicated favorites and information on a user associated with the indicated favorites from the computer comprising a digital device to a host computing system that:
generates at least one of: recommendations for additional menu items based on the indicated favorites and payment modification information comprising information on an authorized modification of a payment amount based on the indicated favorites; and
communicates the at least one of the recommendations or the payment modification information to the digital device.

15. The method of claim 1, further comprising the computer including the purchase order information and the payment information in a single extensible markup language (XML) file, and encoding the XML file into the machine-readable indicia.

16. The method of claim 1, comprising the computer outputting the personal identification number to a user of the computer for use at a point of purchase for the purchase transaction.

17. A system comprising:
a digital device comprising:
one or more processors;
one or more memory components;
and one or more input/output components;
executable instructions stored on at least one of the one or more memory components, the executable instructions being configured to be executed on at least one of the one or more processors so that the system is configured to:

receive a purchase order, via at least one of the one or more input/output components;
receive payment information, via at least one of the one or more input/output components;
use at least one of the one or more processors to generate one machine-readable indicia that encodes each of (i) the purchase order, (ii) the payment information, with the payment information in an encrypted form, the payment information comprising information pertaining to a method of payment, the information pertaining to the method of payment being configured for use in a purchase transaction for the purchase order, and (iii) a key that is required for decrypting the encrypted payment information in the machine-readable indicia, the key comprising a personal identification number, the key generated by at least one of the one or more processors;
and display the machine-readable indicia via at least one of the one or more input/output components;
wherein the system is further capable of:
receiving a key required for decryption of the encrypted payment information in the machine-readable indicia from a user, wherein the key is a Personal Identification Number (PIN); and
having the machine-readable indicia scanned by an imaging component to decode the machine-readable indicia to provide the purchase order and the payment information to provide an indication of the purchase order and the payment information on a display, comprising the imaging component decrypting the encrypted payment information using the received key that is required for decryption of the encrypted information so that a payment for a purchase of the one or more products and/or one or more services may be transacted.

18. The system of claim 17, in which the system is further capable of:
communicating the payment information to a payment system;
executing a payment through the payment system; and
recording an indication that the purchase order has been transacted.

19. A method comprising:
receiving purchase order information via one or more input/output components of a digital device, in which the purchase order information comprises one or more products and/or one or more services selected for purchase;
receiving payment information via one or more input/output components of the digital device, in which the payment information comprises information pertaining to a method of payment, the information pertaining to the method of payment being configured for use in a purchase transaction for the purchase order information;
generating, by the digital device, one machine-readable indicia that encodes each of (i) the purchase order information, (ii) the payment information that is configured for use in a purchase transaction for the purchase order information, with the payment information in an encrypted form, and (iii) a key that is required for decryption of the encrypted payment information in the machine-readable indicia, the key comprising a personal identification number, comprising the digital device encrypting the payment information and generating the key that is required for decrypting the encrypted payment information in the machine-readable indicia;

displaying the machine readable indicia on a screen of the digital device;

an indicia reading terminal receiving from a user the key that is required for decryption of the encrypted payment information in the machine-readable indicia;

the indicia reading terminal scanning and decoding the machine readable indicia to provide the purchase order information and the payment information that is configured for use in the purchase transaction for the purchase order, comprising the indicia reading terminal decrypting the encrypted payment information using the received key that is required for decryption of the encrypted payment information; and then transacting the purchase transaction for the purchase order based on the scanned and decoded machine readable indicia that comprises each of the purchase order information, the scanned payment information that is configured for use in the purchase transaction for the purchase order, and the key that is required for decryption of the encrypted payment information.

20. The method of claim 19, comprising the digital device outputting the personal identification number to a user for use at a point of purchase for the purchase transaction.

21. The method of claim 20, comprising the indicia reading terminal receiving the personal identification number at the point of purchase for the purchase transaction.

\* \* \* \* \*